United States Patent [19]

Kagawa

[11] Patent Number: 5,978,725
[45] Date of Patent: Nov. 2, 1999

[54] BRAKE CONTROL APPARATUS

[75] Inventor: Kazunori Kagawa, Toyota, Japan

[73] Assignee: Toyota Jidosha Kabushiki Kaisha, Japan

[21] Appl. No.: 09/198,587

[22] Filed: Nov. 24, 1998

[30] Foreign Application Priority Data

Nov. 28, 1997 [JP] Japan ..................... 9-328986

[51] Int. Cl.⁶ .................... B60T 13/00; B60T 8/00
[52] U.S. Cl. .................. 701/70; 701/78; 303/122.06; 303/125; 303/155
[58] Field of Search ................. 701/70, 78, 95, 701/98, 79, 52; 303/122.06, 155, 125

[56] References Cited

U.S. PATENT DOCUMENTS

| 4,697,130 | 9/1987 | Dadpey et al. ................. 318/760 |
| 4,774,667 | 9/1988 | Kuraoka et al. ................. 701/78 |
| 5,539,641 | 7/1996 | Littlejohn ................. 701/70 |

FOREIGN PATENT DOCUMENTS

| 4-201629 | 7/1992 | Japan . |
| 8-175348 | 7/1996 | Japan . |

Primary Examiner—William A. Cuchlinski, Jr.
Assistant Examiner—Yonel Beaulieu
Attorney, Agent, or Firm—Finnegan, Henderson, Farabow, Garrett & Dunner, L.L.P.

[57] ABSTRACT

A brake control apparatus switches the braking mode from an auto-braking mode to a manual braking mode when a braking operation is carried out. The braking control apparatus includes a mode switching delay unit for delaying the time at which the braking mode is switched to the manual mode from the start time of the braking operation.

10 Claims, 6 Drawing Sheets

BRAKE CONTROL APPARATUS

BACKGROUND OF THE INVENTION

1. Field of the Invention

The present invention relates to a brake control apparatus, and more particularly to a brake control apparatus switching a control mode from an auto-braking mode, in which a brake force is controlled in accordance with a distance between a vehicle and a forward vehicle or obstacle, to a manual braking mode in which the brake force is controlled in accordance with a braking operation of a driver.

2. Description of the Related Art

Conventionally, a running control apparatus in which a distance between a vehicle and a forward vehicle is measured and a running control of the vehicle is performed, based on the measured distance and a speed of the vehicle, so that the distance between the vehicle and the forward vehicle is not less than a constant value has been proposed (Japanese Laid-Open Patent Application No.4-201692). In such a running control apparatus, a running state (the speed and/or acceleration) of the vehicle is controlled by the acceleration control and brake control (in an auto-braking mode) based on the measured distance between the vehicle and the forward vehicle and the speed of the vehicle. Then, for example, when a driver carries out a brake operation (an operation of stepping on a brake pedal) during the brake force control in the auto-braking mode, an intention of the driver takes priority over the brake force control in the auto-braking mode, so that the auto-braking mode is released. As a result, the vehicle is braked with a brake force depending on an amount of operation of the brake pedal (in the manual braking mode).

Figure 1:
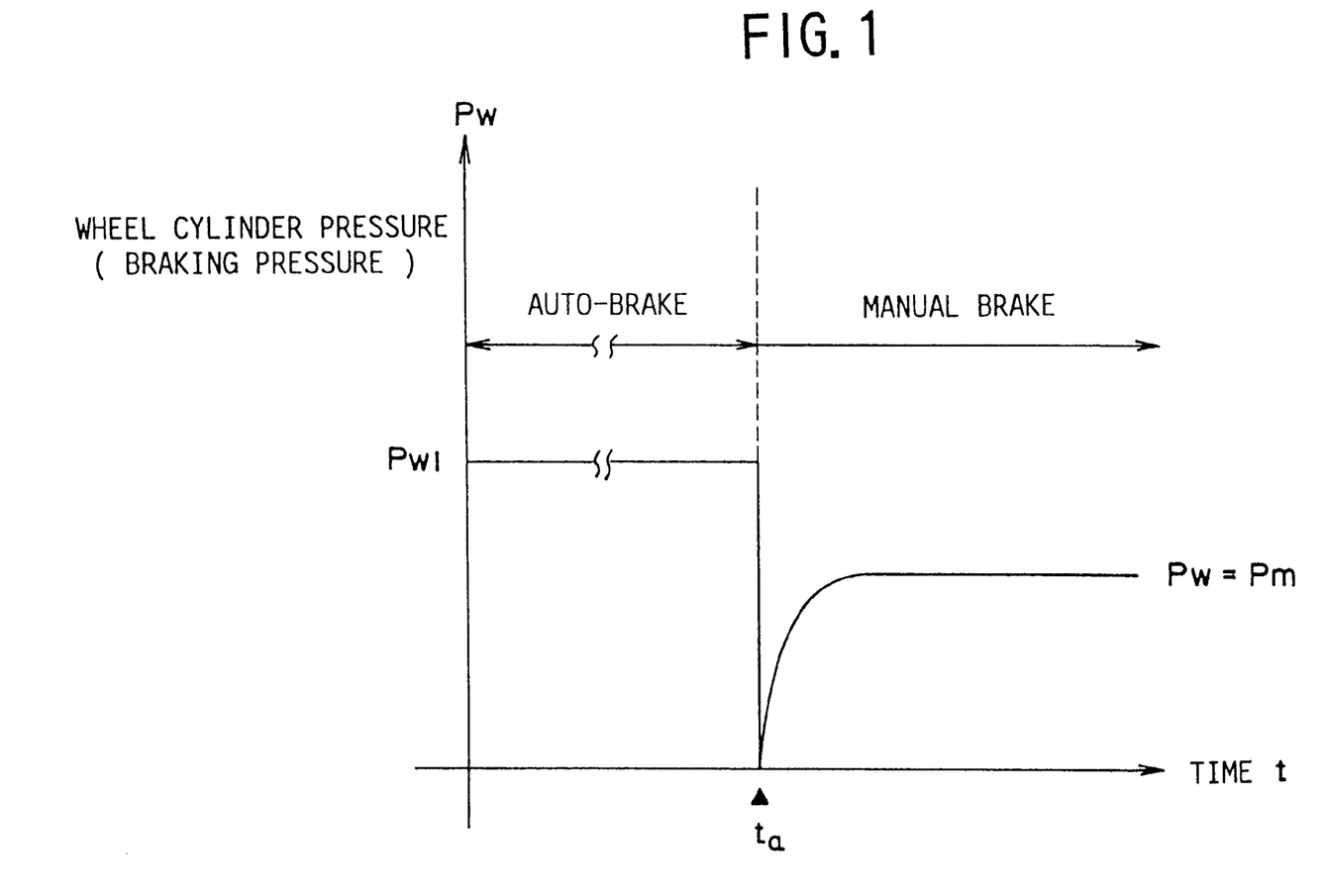
FIG. 1 is a diagram illustrating an example of a state of a brake pressure before and after switching the auto-brake mode to the manual mode in a conventional case.

In the above mentioned conventional brake control apparatus, as shown in FIG. 1, when a brake force (a wheel cylinder pressure) Pw (=Pw1) is generated, the auto-braking mode may be switched to the manual braking mode. In this case, after the brake force Pw is rapidly decreased, the brake force Pw (=Pm: a master cylinder pressure) is gradually increased in accordance with the amount of braking operation (the amount of operation of stepping on the brake pedal). As a result, at a time ta at which the control mode is switched to the manual braking mode, the deceleration of the vehicle is temporarily decreased. At this time, the driver may feel a physical disorder, such as the vehicle advancing.

SUMMARY OF THE INVENTION

Accordingly, a general object of the present invention is to provide a novel and useful brake control apparatus in which the disadvantages of the aforementioned prior art are eliminated.

A specific object of the present invention is to provide a brake control apparatus in which the control mode is switched from the auto-braking mode to the manual braking mode with a variation of the brake force being as small as possible.

To achieve the objects and in accordance with the purpose of the invention, as embodied and broadly described herein, the brake control apparatus of the invention comprises a means for switching an auto-braking mode to a manual braking mode when a braking operation is carried out, the auto-braking mode being a braking mode in which a brake force of a vehicle is controlled based on predetermined information regardless of a braking operation, the manual braking mode being a braking mode in which the vehicle is braked by a brake force depending on an amount of braking operation, and a mode switching delay means for delaying a time at which the braking mode should be switched to the manual mode from a start time of the braking operation.

In such a brake control apparatus, a time at which the braking mode is actually switched to the manual braking mode is delayed from the start time of the braking operation. Thus, the auto-braking mode is switched to the manual braking mode in a state where a brake force corresponding to an amount of braking operation after start of the braking operation is generated.

According to the present invention, since the auto-braking mode is switched to the manual braking mode in the state where the brake force corresponding to the amount of braking operation after start of the braking operation is generated, when the braking mode is switched from the auto-braking mode to the manual braking mode by the braking operation, the variation of the brake force can be lowered.

In a case using a hydraulic braking system, the brake force can be represented by a hydraulic pressure (a braking pressure). In a case using an electric braking system, the brake force can be represented by a voltage (a braking voltage).

The time at which the braking mode should be switched to the manual mode may be delayed based on a measured time or an amount of braking operation.

From the former point of view, the mode switching delay means may comprise timer means for measuring a time from the start time of the braking operation; and mode switching instruction means for instructing to switch to the manual braking mode when the measured time obtained by the timer means reaches a predetermined time.

The above predetermined time may be changeable based on the running state (the vehicle speed and/or acceleration) of the vehicle.

From the latter point of view, the mode switching delay means may comprise brake operation determination means for determining whether an amount of braking operation from the start of the braking operation reaches a predetermined value; and mode switching instruction means for instructing to switch to the manual braking mode when the brake operation determination means determines that the amount of operation from the start of the braking operation reaches the predetermined value.

The predetermined value may set based on the running state of the vehicle and/or the structure of the braking system.

In order to control the difference between the brake force depending on the amount of braking operation and the actual brake force to be as small as possible when the braking mode is switched to the manual braking mode, the above brake control apparatus controlling, based on the measured time, the time at which the braking mode should be switched may further comprise braking operation state detecting means for detecting a state of the braking operation; and target setting means for setting a target value of a brake force based on the state of the braking operation detected by the braking operation state detecting means; and control means for controlling the brake force so that the brake force reaches the target value set by the target setting means after the predetermined time from the start of the braking operation.

In such a brake control apparatus, the target value of the brake force is set based on the state of the braking operation. For example, in a rapidly braking case, a target value corresponding to a relatively large brake force is set. In a slowly braking case, a target value corresponding to a relatively small brake force is set. The brake force is then controlled so that the brake force reaches the target value after the predetermined time used in the mode switching delay means.

Since the target value of the brake force depends on the state of the braking operation, the brake force depending on the amount of braking operation after the predetermined time elapses can be close to the target value. Thus, when the braking mode is switched to the manual braking mode after the predetermined time elapses, the brake force depending on the amount of the braking operation can be closer to the actual brake force which has already controlled.

The target setting means may comprise operation means for calculating an estimate value of the amount of braking operation after the predetermined time from the start of the braking operation based on the state of the braking operation detected by the braking operation state detecting means, the estimate value calculated by the operation means being set as the target value.

In such brake control apparatus, the target value of the brake force is set at the amount of the braking operation. Thus, due to improving the accuracy of the estimation, when the braking mode is switched to the manual braking mode after the predetermined time elapses, a brake force depending on the amount of the braking operation can be even closer to the actual brake force which has been controlled.

In the brake control apparatus in which the brake force is controlled to the target value before the braking mode is switched to the manual braking mode, the mode switching instruction means may comprise means for instructing the switching to the manual braking mode when a brake force depending on the braking operation is equal to or greater than the brake force controlled by the control means even before the measured time obtained by the timer means reaches the predetermined time.

In such brake control apparatus, the switching to the manual braking mode can be performed in a state the difference between the brake force depending on the amount of braking operation and the actual brake force can be controlled to be as small as possible.

In the brake control apparatus in which the brake force is controlled using, as a target value, the estimate value of the amount of braking operation after the predetermined time from the start of the braking operation, there may be further provided means for inhibiting the control means from controlling the brake force when the estimate value is equal to or greater than a present brake force in the auto-braking mode.

In such a brake control apparatus, the control means is inhibited from controlling the brake force, the brake force controlled in the auto-braking mode is maintained until the predetermined time elapses from the start of the braking operation. When the braking operation is rapidly performed to switch to the manual braking mode, the difference between the brake force maintained in the auto-braking mode and the brake force depending on the amount of the braking operation is not large.

In such a brake control apparatus, the mode switching instruction means may comprise means for instructing the switching to the manual braking mode when the brake force depending on the braking operation is equal to or greater than the present brake force in the auto-braking mode even before the measured time obtained by the timer means reaches the predetermined time.

According to such a brake control apparatus, switching to the manual braking mode can be rapidly performed in a state where the difference between the brake force depending on the amount of braking operation and the actual brake force is as small as possible.

In addition, in the brake control apparatus in which the brake force is controlled to the target value before the braking mode is switched to the manual braking mode, the braking operation state detecting means may comprise either means for detecting variation of the brake force depending on the braking operation as the state of the braking operation, or means for detecting variation of an amount of braking operation as the state of the braking operation.

For example, in the brake control apparatus for the hydraulic brake system, the variation of the master cylinder pressure controlled by the braking operation may be used as the variation of the brake force based on the braking operation. The variation of the operation stroke of the brake pedal may be used as the variation of the amount of brake operation.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBOIDMENTS

A description will be given of embodiments of the present invention.

Figure 2:
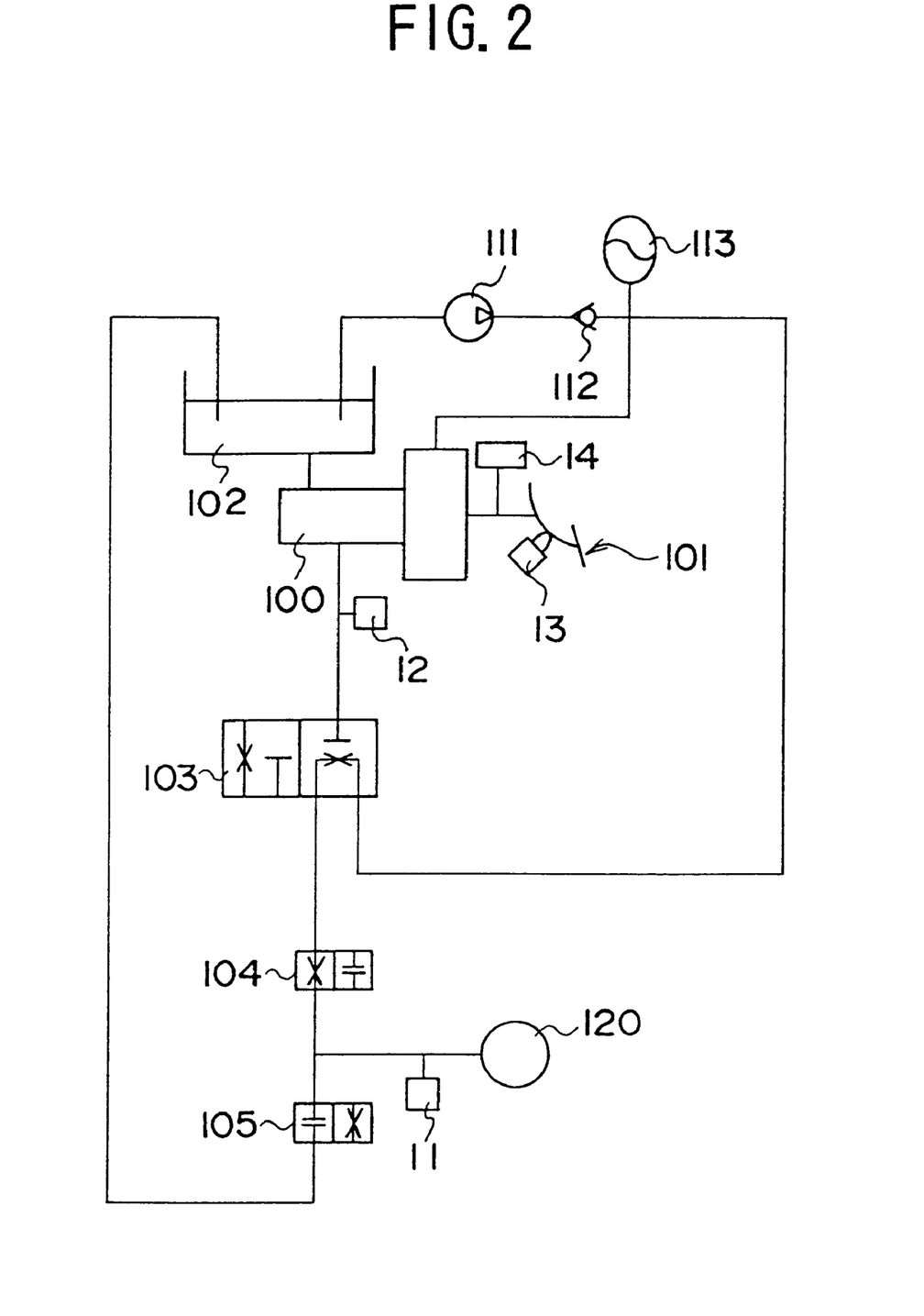
FIG. 2 is a diagram illustrating a constitution example of a brake system which should be controlled by a brake control apparatus according to an embodiment of the present invention.

A hydraulic brake system which should be controlled by a brake control apparatus according to an embodiment of the present invention is shown in FIG. 2. Although the hydraulic brake system shown in FIG. 2 brakes a single wheel, an actual hydraulic system is formed so as to brake all wheels (four wheels).

Referring to FIG. 2, brake oil is always supplied from an oil reservoir 102 to a master cylinder. Due to stepping on a brake pedal 101 connected to a moving shaft of a master cylinder 100, an oil pressure (a master cylinder pressure) Pm is generated at an outlet port of the master cylinder 100. The outlet port of the master cylinder 100 is coupled to a wheel cylinder 120 via a solenoid valve 103 used to switch a passage and a pressure increasing solenoid valve 104. The pressure solenoid valve 104 is usually in an open state.

In addition, the brake oil in the oil reservoir 102 is caused to increase the pressure by a pump 111. The brake oil having the increased pressure is supplied to the solenoid valve 103 via a check valve 112. The oil pressure, increased by the pump 111, between the check valve 112 and the solenoid valve 103 is maintained at a relatively high value by an accumulator 113.

The solenoid valve 103 switches a passage to be connected to a passage communicating with the wheel cylinder 120 between the passage from the master cylinder 100 and the high pressure hydraulic passage from the accumulator 113. FIG. 2 shows a state in which the high pressure hydraulic passage is connected to the passage communicating with the wheel cylinder.

A master pressure sensor 12 for detecting the master cylinder pressure Pm is provided near the outlet port of the master cylinder 100. A brake pressure sensor 11 for detecting the wheel cylinder pressure Pw is provided in an oil supply passage.

A pressure decreasing solenoid valve 105 which is usually in a closed state is provided between an oil supply passage communicating with the wheel cylinder 120 and the oil reservoir 102. When the pressure decreasing solenoid valve 105 is switched to be in the open state, the brake oil in the oil supply passage communicating with the wheel cylinder 120 is returned to the oil reservoir 102 via the pressure decreasing solenoid valve 105. As a result, the wheel cylinder pressure Pw is decreased.

A brake switch 13 detecting a start of an operation for stepping on the brake pedal 101 is provided to the brake pedal 101. A stroke sensor 14 detecting an amount of operation of the brake pedal 101 is provided to the moving shaft of the master cylinder 100.

The brake control apparatus which controls the hydraulic brake system as described above is formed as shown in FIG. 3.

Figure 3:
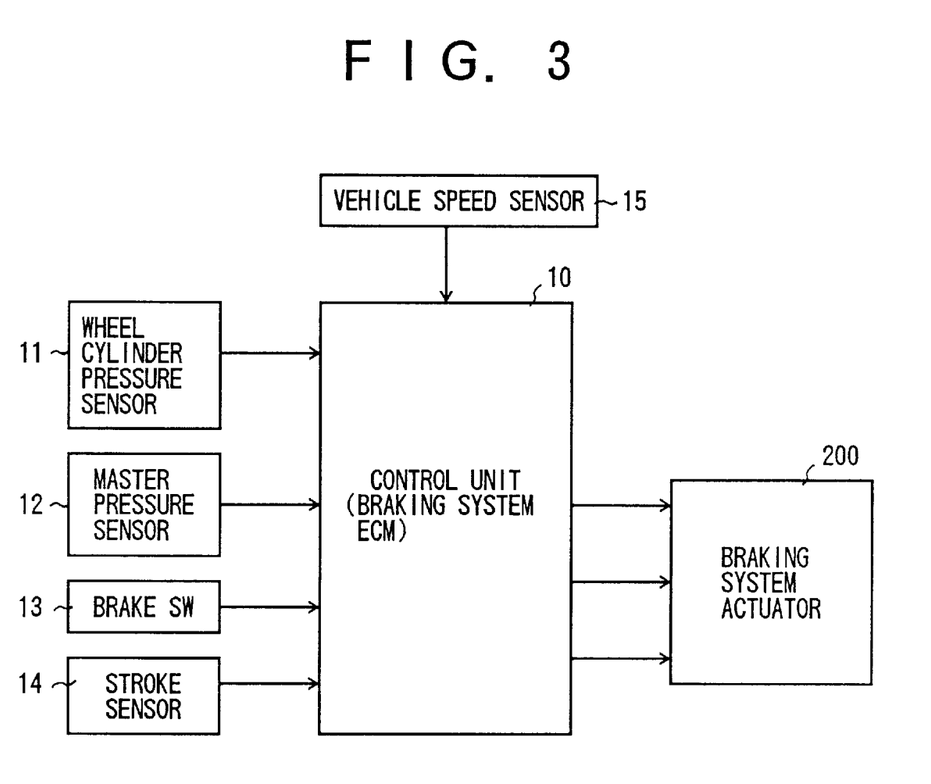
FIG. 3 is a block diagram illustrating the brake control apparatus according to the embodiment of the present invention.

Referring to FIG. 3, respective detecting signals from the wheel cylinder pressure sensor 11, the master pressure sensor 12, the brake switch 13 and the stroke sensor 14 are supplied to a control unit (a brake system ECU) 10. In addition, a detecting signal, corresponding to a running speed of the vehicle, from a vehicle speed sensor 15 is supplied to the control unit 10. The control unit 10 controls actuators 200 of the hydraulic brake system as described above based on the detecting signals from the respective sensors. The actuators 200 includes the solenoid valve 103, the pressure increasing solenoid valve 104 and the pressure decreasing solenoid valve 105.

Figure 4:
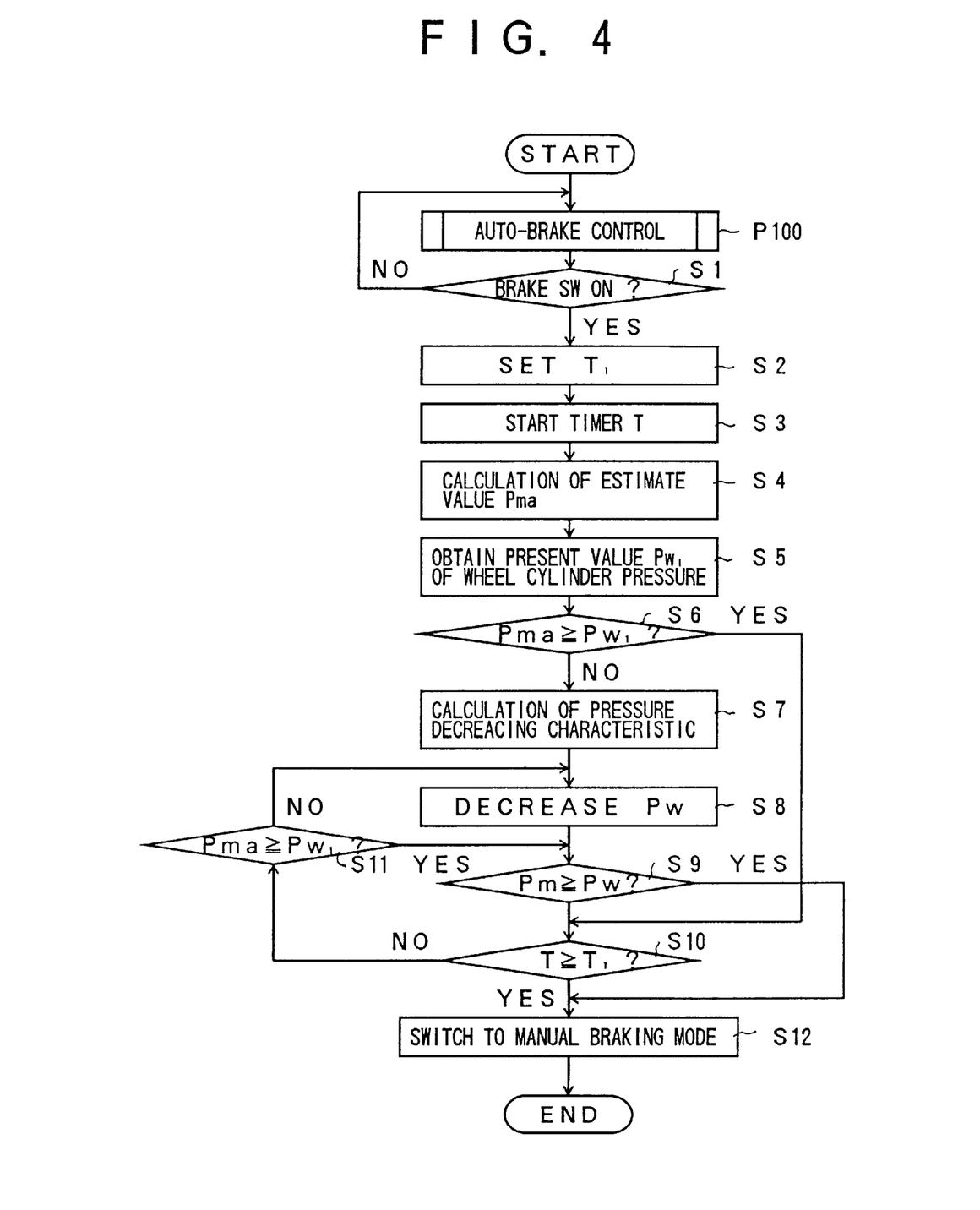
FIG. 4 is a flowchart illustrating an example of a procedure of a brake control.

The above mentioned control unit 10 controls the hydraulic brake system in accordance with, for example, a procedure shown in FIG. 4.

Referring to FIG. 4, the control unit 10 executes an auto-brake control P100. That is, the brake control is performed in the auto-braking mode. In the auto-brake control P100, for example, the wheel cylinder pressure Pm is controlled so that the distance between the vehicle and the forward vehicle is maintained at a value not less than a constant value. Specifically, as shown in FIG. 2, in a state where the solenoid valve 103 connects the high pressure passage from the accumulator 113 to the passage extending toward the wheel cylinder 120, switching controls of the pressure increasing solenoid valve 104 and the pressure decreasing solenoid valve 105 are performed so that the wheel cylinder pressure Pm is maintained at a proper value.

While such an auto-brake control is being performed, the control unit 10 determines whether the brake switch 13 is turned on by the operation for stepping on the brake pedal 101 (S1). In such a state, when a driver steps on the brake pedal 101 to switch the brake control in the auto-braking mode to a brake control based on the operation for stepping on the brake pedal 101 (the manual braking mode), the control unit 10 determines that the brake switch 13 is turned on. The control unit 10 then sets a delay time T1 (S2). The delay time T1 is, for example, not greater than 100 milliseconds, and depends on the vehicle speed detected by the vehicle speed sensor 15. The larger the vehicle speed, the smaller the delay time T1 is set. The delay time T1 may be set based on a parameter directly or indirectly indicating a degree of emergency, such as a speed at which a driver steps on the brake pedal or the distance between the vehicle and the forward vehicle. For example, the larger the speed at which the driver steps on the brake pedal, the smaller the delay time T1. In addition, the smaller the distance between the vehicle and the forward vehicle, the smaller the delay time T1.

Figure 5:
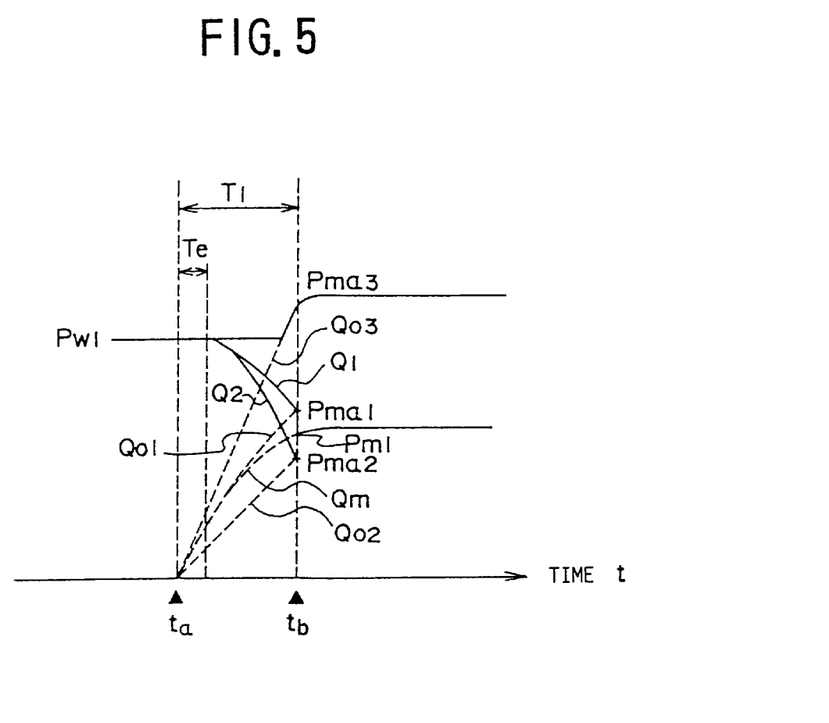
FIG. 5 is an example of a state of a brake force before and after switching the auto-brake mode to the manual mode in accordance with the procedure shown in FIG. 4.

Next, the control unit 10 causes an internal timer to start (S3). The control unit 10 calculates an estimate value Pma of the master cylinder pressure Pm at a time after the delay time T1 based on an operation state of the brake pedal 101 (S4). The estimate value Pma of the master cylinder pressure Pm is calculated based, for example, on a variation with time (a master pressure increasing speed) of the master cylinder pressure detected by the master pressure sensor 12. Based on the variation with time of the master cylinder pressure Pm immediately after the operation of the brake pedal 101 is started (the on-operation of the brake switch is detected), a pressure increasing characteristic Q01 of the master cylinder pressure Pm shown in FIG. 5 is estimated. An estimate value Pma1 of the master cylinder pressure Pm at a time after the delay time T1 is calculated based on the pressure increasing characteristic Q01.

After the calculation of the estimate value Pma of the master cylinder pressure Pm is completed, the control unit 10 obtains a present value Pw1 of the wheel cylinder pressure Pw from the wheel cylinder pressure sensor 11 (S5). The present value Pw1 of the wheel cylinder pressure is based on the auto-brake control. It is then determined whether the estimate value Pma of the master cylinder pressure Pm calculated as described above is equal to or greater than the present value Pw1 of the wheel cylinder pressure Pw (S6). For example, when the estimate value of the master cylinder pressure Pm is equal to Pma1 (see FIG. 5), it is determined that this estimate value Pma1 is neither equal to nor greater than the present value Pw1 of the wheel cylinder pressure Pw (No in step S6). In this case, a pressure decreasing characteristic Q1 of the wheel cylinder pressure Pw is calculated (S7). The pressure decreasing characteristic Q1 a characteristic in accordance with which the wheel cylinder having the present value Pw1 reaches the estimate value Pma1 of the master cylinder pressure Pm after the delay time T1 (see FIG. 5).

After the pressure decreasing characteristic Q1 of the wheel cylinder pressure Pw is calculated as described above, the control unit 10 controls the pressure decreasing solenoid valve 105 so that the wheel cylinder pressure Pw is decreased in accordance with the pressure decreasing characteristic Q1 (S8). After this, while the determination of whether the value of the master cylinder pressure Pm increased by the operation of the brake pedal 101 is equal to or greater than the the value of the wheel cylinder pressure Pw decreased in accordance with the pressure decreasing characteristic Q1 (S9), the determination of whether the measured time of the timer T reaches the delay time T1 (S10) and the determination of whether the estimate value Pma (=Pma1) of the master cylinder pressure Pm does not reach the initial value Pw1 of the wheel cylinder pressure Pw (S11) are being carried out, the pressure decreasing process of the wheel cylinder pressure in accordance with the pressure decreasing characteristic Q1 (S8) is repeatedly performed.

When the variation of the master cylinder pressure Pm generated by an actual stepping operation of the brake pedal 101 is, as indicated by a characteristic Qm in FIG. 5, less than the estimated variation (the pressure increasing characteristic Q01), the actual value Pm1 of the master cylinder pressure Pm does not reach the estimate value Pma1 even if the timer T reaches the delay time T1. In this case, it is determined, in step S9, that the value of the master cylinder pressure Pm does not reach the value of the wheel cylinder pressure Pw, and it is determined, in step S10, that the delay time T1 has elapsed (YES).

When the delay time T1 has elapsed from a time ta at which the on-operation of the brake switch 13 is detected, the control unit 10 outputs a switching signal to the solenoid valve 103 at a time tb at which the delay time T1 elapses (see FIG. 5) (S12). By the switching signal, the solenoid valve 103 switches the hydraulic passage so that the hydraulic passage of the master cylinder 100 communicates with the hydraulic passage toward the wheel cylinder 120. Thus, the switching to the manual braking mode is performed. That is, after this, the master cylinder pressure Pm depending on the amount of the stepping operation of the brake pedal 101 is applied to the wheel cylinder 120 (Pw=Pm), so that the brake control of the vehicle is carried out in accordance with the stepping operation of the brake pedal 101.

Figure 6:
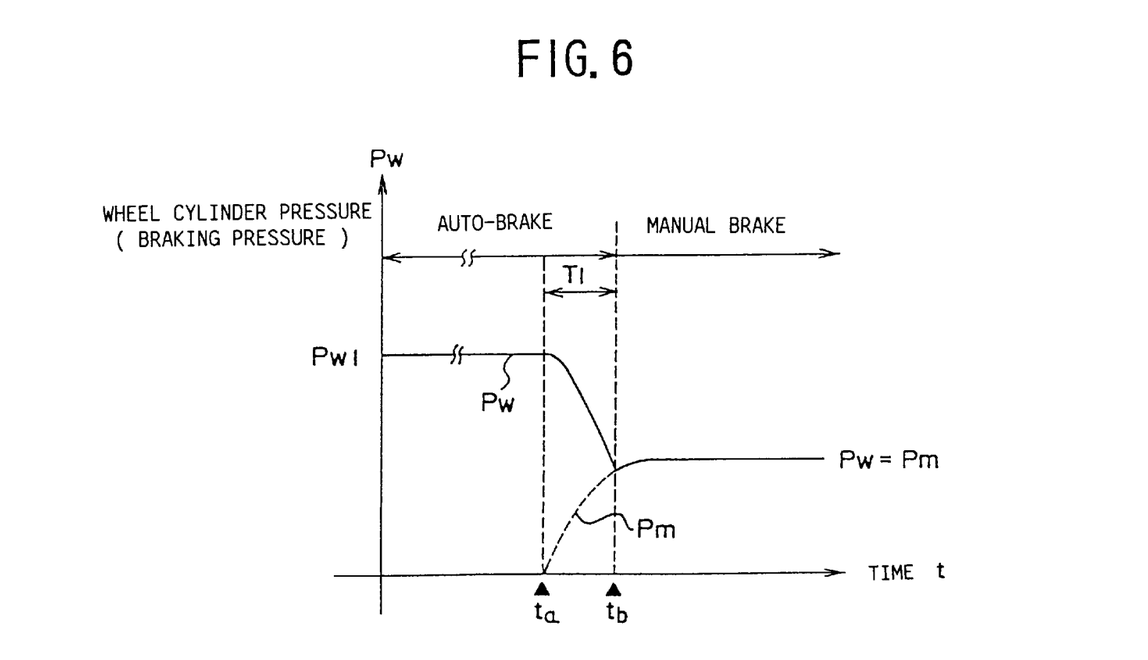
FIG. 6 is a diagram illustrated a detailed state of the brake force shown in FIG. 5.

According to the switching control as described above, as shown in FIG. 6, at the time tb after the delay time T1 elapses from the time ta at which the operation of the brake pedal 101 is started, the auto-braking mode is switched to the manual braking mode. Thus, in a state where the master cylinder pressure Pm is close to the wheel cylinder pressure Pw, the braking mode is switched to the manual mode. Further, since the wheel cylinder pressure Pw is decreased to the estimate value Pma in the period of delay time T1, the master cylinder pressure Pm is further close to the actual wheel cylinder pressure Pw when the braking mode is switched. Thus, the variation of the brake force when the braking mode is switched is small, so that the feeling of the driver that the vehicle temporarily advances can be lowered.

In the process in accordance with the procedure as shown in FIG. 4, when the estimated variation of the master cylinder Pm is, as indicated by a pressure increasing characteristic Q02 in FIG. 5, less than variation (the characteristic Qm) of the master cylinder pressure Pm generated by the actual stepping operation of the brake pedal 101, an estimate value Pma2, which is decided, in accordance with the pressure increasing characteristic Q02, as a control target value of the wheel cylinder pressure Pw at a time tb after the delay time T1, is less than an actual value Pm1 of the master cylinder Pm at the time tb. In this case, since the decreased amount of wheel cylinder pressure Pm is relatively large, the increased master cylinder pressure Pm reaches the decreased wheel cylinder pressure Pw before the measured time of the timer T reaches the delay time T1. Thus, when it is determined, in step 9, that the master cylinder pressure Pm has reached the wheel cylinder pressure Pw, the braking mode is immediately switched to the manual mode (the switching of the solenoid valve 103) (S12).

In such a case, even before the delay time T1 elapses, the auto-braking mode is switched to the manual brake mode in a state where the master cylinder pressure Pm is almost the same as the wheel cylinder pressure Pw. Thus, at an earlier time after the operation of the brake pedal 101 is started, the braking mode is switched to the manual mode, and there is little variation of the brake force.

Furthermore, in the process according to the procedure shown in FIG. 4, there is a case where the estimate value Pma of the master cylinder after the delay time T1 has elapsed is, as shown in FIG. 5, a value Pma3 greater than the present value Pw1 of the wheel cylinder pressure Pw (the brake operation is carried out in accordance with the pressure rapidly increasing characteristic Q03)(YES in step S6). In this case, the wheel cylinder pressure Pm is not controlled and it is determined in step S9 whether the master cylinder pressure Pm reaches the wheel cylinder pressure Pw. The determination of whether the measured time reaches the delay time T1 (S10) and the determination of whether the estimate value Pma3 of the master cylinder pressure Pm is equal to or greater than the initial value Pw1 of the wheel cylinder pressure Pw (S11) are then repeatedly executed.

When it is determined, due to the rapidly stepping operation of the brake pedal 101, that the master cylinder pressure Pm has reached the wheel cylinder pressure Pw (=Pw1) before the delay time T1 elapses (YES in step 9), the auto-braking mode is switched to the manual braking mode (S12).

In such a case, at an earlier time after the operation of the brake operation is started, the braking mode is switched from the auto-braking mode to the manual mode. The brake of the vehicle is performed in accordance with the rapidly stepping operation of the brake pedal 101. According to such a switching control, the brake of the vehicle can be performed, without decrease of the brake pressure (the brake force), in accordance with the rapidly stepping operation of the brake pedal 101. Thus, in an emergency case, the vehicle can be more safely braked.

In the process in accordance with the above-mentioned procedure shown in FIG. 4, the estimate value Pma of the master cylinder Pm is calculated based on the variation (a pressure increasing speed) of the master cylinder pressure Pm detected by the master pressure sensor 12. The calculation method of the estimate value Pma is not limited to the above. The estimate value Pma of the master cylinder pressure may be calculated using the variation (a stepping speed) of the amount of stepping operation of the brake pedal 101 detected by the stroke sensor 14.

In FIG. 5, a slight period of time Te from the time ta at which the stepping operation of the brake pedal 101 is started (the brake switch 13 is turned on) corresponds to a period of time required for the process (steps 2–6) which should be performed before starting the actual decrease of the wheel cylinder pressure Pm.

Figure 7:
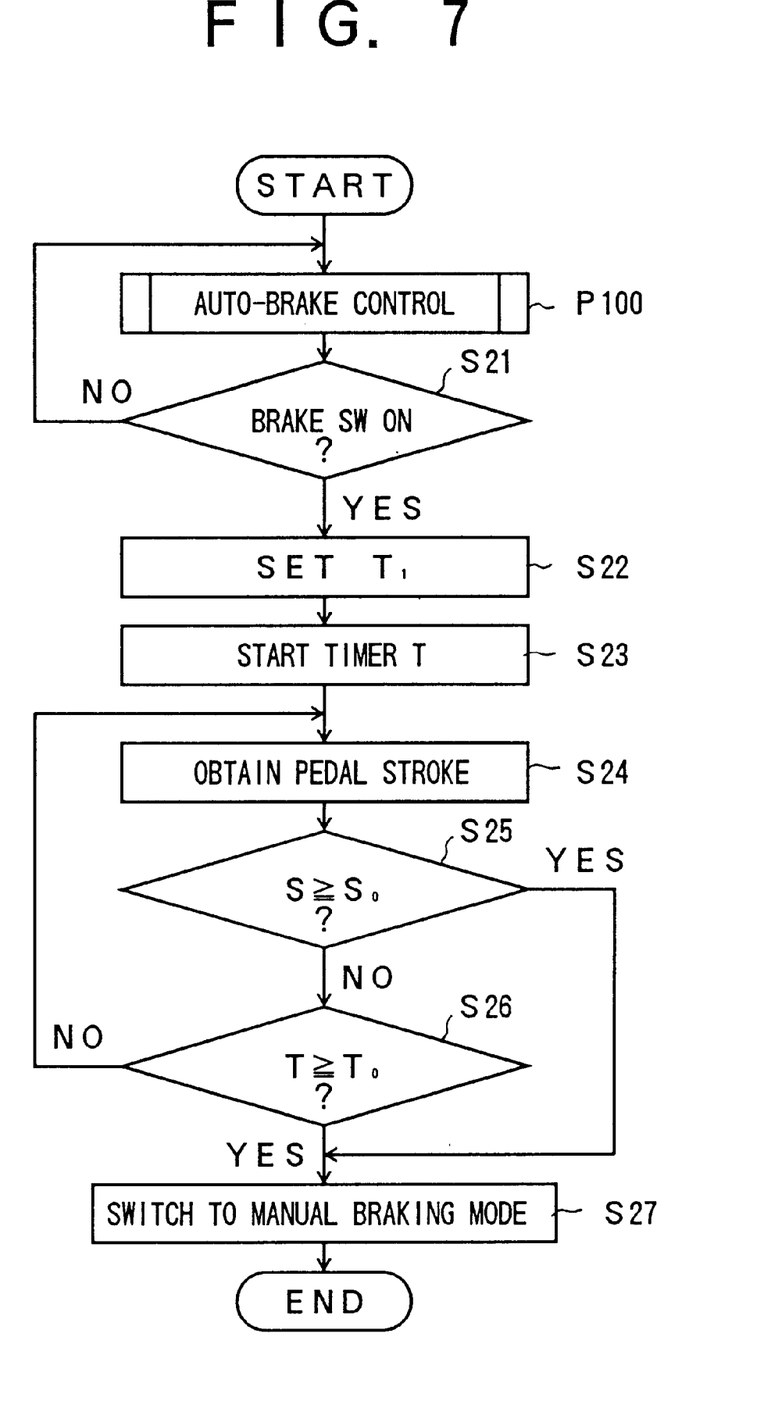
FIG. 7 is a diagram illustrating another example of the procedure of the brake control.

From a point of view in which the auto-braking mode is switched to the manual mode in a state where the difference between the master cylinder pressure Pm generated and the actual wheel cylinder pressure Pw is as small as possible, the control unit 10 may execute the process in accordance with a procedure as shown in FIG. 7.

Referring to FIG. 7, while the auto-brake control P100 is being performed, the control unit 10 determines whether the brake switch 13 is turned on (S21), in the same manner as in the process shown in FIG. 4. When the driver steps on the brake pedal 101 to release the auto-brake control P100, the brake switch 13 is turned on. The setting process of the delay time T1 (S22) and the start process of the internal timer T (S23) are then successively performed in the same manner as the processes shown in FIG. 4.

After this, the control unit 10 obtains a stroke S of the brake pedal (the amount of stepping operation of the brake pedal) which is detected by the stroke sensor 14 (S24). It is determined whether the obtained stroke S reaches a predetermined set value So (S25). The set value So is equal to or greater than an idle stroke depending on a structure of the master cylinder 100 and set at a value based on a considerable state of the braking operation.

After this, with the determination of whether the elapsed time reaches the delay time T1 (S26), it is repeatedly determined whether the pedal stroke obtained by the stroke sensor 14 reaches the set value So (S24 and S25). When the stroke of the brake pedal 101 reaches the set value So (YES in step S25), the brake control in the auto-braking mode is switched to the brake in the manual braking mode (S27). Thus, after this, the brake of the vehicle is performed in accordance with the stepping operation of the brake pedal 101 by the driver.

On the other hand, when it is determined that the elapsed time reaches the delay time T1 before the pedal stroke S reaches the set value So, the auto-braking mode is switched to the manual braking mode.

According to the switching control of the braking mode as described above, when the driver rapidly steps on the brake pedal 101 to change to the manual braking mode for an emergency, the switching to the manual braking mode can be implemented at an earlier time. In addition, when a relatively slow operation of the brake pedal 101 is carried out, the switching to the manual braking mode is implemented at a later time. Thus, the switching from the auto-braking mode to the manual braking mode can be performed so as to be suitable for the braking operation feeling of the driver. Further, if the stroke S does not reach the set value So within the set time T1, the switching to the manual braking mode is compulsorily performed.

In a case, as described above, where the time at which the switching to the manual braking mode should be performed is delayed from the start of the stepping operation of the brake pedal 101 based on the amount of stepping operation (the stroke) of the brake pedal 101, a value of the master cylinder pressure Pm has been already generated when the switching to the manual mode is performed. Thus, the difference between the wheel cylinder pressure Pw and the master cylinder pressure Pm at a time of the switching to the manual braking mode can be small.

The present invention is not limited to the aforementioned embodiments, and other variations and modifications may be made without departing from the scope of the claimed invention.

The present application is based on Japanese priority application No.9-328986 filed on Nov. 28, 1997, the entire contents of which are hereby incorporated by reference.

What is claimed is:

1. A brake control apparatus comprising:

means for switching an auto-braking mode to a manual braking mode when a braking operation is carried out, the auto-braking mode being a braking mode in which a brake force of a vehicle is controlled based on predetermined information regardless of a braking operation, the manual braking mode being a braking mode in which the vehicle is braked by a brake force depending on an amount of braking operation; and mode switching delay means for delaying a time at which the braking mode should be switched to the manual mode from a start time of the braking operation.

2. The brake control apparatus as claimed in claim 1, wherein said mode switching delay means comprises:

timer means for measuring the time from the start time of the braking operation and mode switching instruction means for instructing the switching to the manual braking mode when the measured time obtained by said timer means reaches a predetermined time.

3. The brake control apparatus as claimed in claim 1, wherein said mode switching delay means comprises:

brake operation determination means for determining whether an amount of braking operation from the start of the braking operation reaches a predetermined value; and mode switching instruction means for instructing switching to the manual braking mode when said brake operation determination means determines that the amount of operation from the start of the braking operation reaches the predetermined value.

4. The brake control apparatus as claimed in claim 2 further comprising:

braking operation state detecting means for detecting a state of the braking operation; and target setting means for setting a target value of a brake force based on the state of the braking operation detected by said braking operation state detecting means; and control means for controlling the brake force so that the brake force reaches the target value set by said target setting means after the predetermined time from the start of the braking operation.

5. The brake control apparatus as claimed 4, wherein said target setting means comprises:

operation means for calculating an estimated value of the amount of braking operation after the predetermined time from the start of the braking operation based on the state of the braking operation detected by said braking operation state detecting means, the estimated value calculated by said operation means being set as the target value.

6. The brake control apparatus as claimed in claim 4, wherein said mode switching instruction means further comprises:

means for instructing the switching to the manual braking mode when a brake force depending on the braking operation is equal to or greater than the brake force controlled by said control means even before the measured time obtained by said timer means reaches the predetermined time.

7. The brake control apparatus as claimed in claim 5 further comprising:

means for inhibiting said control means from controlling the brake force when said estimated value is equal to or greater than a present brake force in the auto-braking mode.

8. The brake control apparatus as claimed in claim 7, wherein said mode switching instruction means further comprises:

means for instructing the switching to the manual braking mode when the brake force depending on the braking operation is equal to or greater than the present brake force in the auto-braking mode even before the measured time obtained by said timer means reaches the predetermined time.

9. The brake control apparatus as claimed in claim 4, wherein said braking operation state detecting means comprises:

means for detecting variation of the brake force as the state of the braking operation.

10. The brake control apparatus as claimed in claim 4, wherein said braking operation state detecting means comprises:

means for detecting variation of an amount of braking operation as the state of the braking operation.

* * * * *